(12) United States Patent
Zhang et al.

(10) Patent No.: US 11,703,707 B2
(45) Date of Patent: Jul. 18, 2023

(54) COLOR FILTER SUBSTRATE, MANUFACTURING METHOD THEREOF AND REFLECTIVE DISPLAY PANEL

(71) Applicant: BOE TECHNOLOGY GROUP CO., LTD., Beijing (CN)

(72) Inventors: Xiaofeng Zhang, Beijing (CN); Jianyun Xie, Beijing (CN); Yanqing Chen, Beijing (CN); Jie Tong, Beijing (CN); Weida Qin, Beijing (CN); Zhao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/348,990

(22) Filed: Jun. 16, 2021

(65) Prior Publication Data

US 2022/0163841 A1   May 26, 2022

(30) Foreign Application Priority Data

Nov. 25, 2020   (CN) .......................... 202011336849.8

(51) Int. Cl.
*G02F 1/1335* (2006.01)

(52) U.S. Cl.
CPC .. *G02F 1/133516* (2013.01); *G02F 1/133512* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 6,124,909 A * | 9/2000 | Miyashita | G02F 1/133514 349/113 |
| 2016/0033813 A1* | 2/2016 | Yoon | G02B 5/201 349/108 |
| 2016/0033816 A1* | 2/2016 | Yoon | G02F 1/13439 349/108 |
| 2018/0157103 A1* | 6/2018 | Park | G02F 1/133514 |
| 2019/0103452 A1* | 4/2019 | Jia | H01L 27/3258 |
| 2019/0204634 A1* | 7/2019 | Liang | G02F 1/1336 |
| 2019/0227374 A1* | 7/2019 | Xie | G02F 1/133553 |
| 2019/0369424 A1* | 12/2019 | Hirato | G02F 1/134309 |

\* cited by examiner

*Primary Examiner* — Ryan Crockett
(74) *Attorney, Agent, or Firm* — Houtteman Law LLC (57) ABSTRACT

The present disclosure provides a color filter substrate, including: a base substrate, and a light-shielding pattern on the base substrate and having a plurality of openings to define a plurality of pixel regions, wherein each of the plurality of pixel regions at least includes a color filtering region, and a color filtering layer is filled in each color filtering region, and at least one of the plurality of pixel regions further includes at least one transparent region, each of which is filled with a transparent non-filtering layer. The present disclosure further provides a reflective display panel and a manufacturing method for a color filter substrate.

15 Claims, 6 Drawing Sheets

COLOR FILTER SUBSTRATE, MANUFACTURING METHOD THEREOF AND REFLECTIVE DISPLAY PANEL

CROSS REFERENCE TO RELATED APPLICATIONS

The present application claims the priority of the Chinese Patent Application No. 202011336849.8 filed on Nov. 25, 2020, the content of which is incorporated herein by reference in its entirety.

TECHNICAL FIELD

The present disclosure relates to the field of display technology, and in particular to a color filter substrate, a manufacturing method thereof and a reflective display panel.

BACKGROUND

Due to characteristics of low power consumption and closeness to nature, a reflective display product has been widely used for outdoor display. The reflective display product does not need a backlight, can display images by only reflecting ambient light, such that the reflective display product has extremely high application space in the field of outdoor display. At present, reflective wearable products have been published. The reflective wearable products have significant advantages, such as ultra-low power consumption, light and thin body and the like. Further, at present, with the popularizing on-line education, the reflective wearable products haing low blue light eye protection characteristics also promote the rapid development of an education tablet and the like, and meets the pursuit of people on health greatly.

SUMMARY

The present disclosure intends to at least solve one of the technical problems in the prior art, and thus provides a color filter substrate, a manufacturing method thereof, and a reflective display panel.

In a first aspect, the embodiment of the present disclosure provides a color filter substrate, including: a base substrate, and a light-shielding pattern on the base substrate and having a plurality of openings to define a plurality of pixel regions, wherein each of the plurality of pixel regions at least includes a color filtering region, and a color filtering layer is filled in each color filtering region, and at least one of the plurality of pixel regions further includes at least one transparent region, each of which is filled with a transparent non-filtering layer.

In some embodiments, the transparent non-filtering layer includes a transparent resin material, and has a light transmittance of greater than 80%.

In some embodiments, a thickness of the transparent non-filtering layer is in a range of 1.5 um to 2.5 um.

In some embodiments, the color filtering layer includes a resin material, and a thickness of the color filtering layer is in a range of 1.5 um to 2.5 um.

In some embodiments, the resin material includes photoresist, and the light-shielding pattern includes a black resin material.

In some embodiments, a thickness of the light-shielding pattern, the thickness of the transparent non-filtering layer and the thickness of the color filtering layer are identical.

In some embodiments, in each pixel region with the transparent region, a ratio of an area of the transparent region to an area of the pixel region is in a range of (0, 0.36].

In some embodiments, each of the plurality of pixel regions includes the transparent region, and each transparent region is filled with the transparent non-filtering layer, and the transparent regions of the plurality of pixel regions have a same size and a same shape.

In some embodiments, in each of the plurality of pixel regions, the transparent non-filtering layer is on a side of the color filtering layer; or, the transparent non-filtering layer is on two opposite sides of the color filtering layer; or, the color filtering layer includes a first color filtering sub-pattern and a second color filtering sub-pattern, and the transparent non-filtering layer is between the first color filtering sub-pattern and the second color filtering sub-pattern; or, the transparent non-filtering layer is in a middle of the color filtering layer, and the color filtering layer surrounds the transparent non-filtering layer; or, the transparent non-filtering layer surrounds the color filtering layer; or, the color filtering layer includes a plurality of color filtering sub-patterns, the transparent non-filtering layer includes a plurality of transparent sub-patterns, and the plurality of color filtering sub-patterns and the plurality of transparent sub-patterns are alternately arranged along a first preset direction; or, the color filtering layer includes a plurality of color filtering sub-patterns, the transparent non-filtering layer includes a plurality of transparent sub-patterns, and the plurality of color filtering sub-patterns and the plurality of transparent sub-patterns are alternately arranged along both the first preset direction and a second preset direction, the first preset direction intersecting the second preset direction.

In some embodiments, in each pixel region, each transparent region includes a first transparent sub-region and a second transparent sub-region on opposite sides of the color filtering region.

In some embodiments, each pixel region includes a plurality of sub-pixel regions of different colors, and color filtering layers in the plurality of sub-pixel regions have respective colors.

In some embodiments, each pixel region includes a red sub-pixel region, a green sub-pixel region, and a blue sub-pixel region, the color filtering layer in the red sub-pixel region is a red filtering layer, the color filtering layer in the green sub-pixel region is a green filtering layer, and the color filtering layer in the blue sub-pixel region is a blue filtering layer.

In some embodiments, the color filter substrate further includes a planarization layer on a side of the light-shielding pattern, the color filtering layer and the transparent non-filtering layer distal to the base substrate, and the planarization layer and the transparent non-filtering layer have a one-piece structure.

In a second aspect, the embodiment of the present disclosure further provides a reflective display panel, including: a color filter substrate and an array substrate opposite to each other, and a liquid crystal layer between the color filter substrate and the array substrate; wherein the color filter substrate includes: a first base substrate, and a light-shielding pattern on a side of the first base substrate proximal to the array substrate and having a plurality of openings to define a plurality of pixel regions, wherein each of the plurality of pixel regions at least includes a color filtering region, and a color filtering layer is filled in each color filtering region, and at least one of the plurality of pixel regions further includes at least one transparent region, each of which is filled with a transparent non-filtering layer.

In some embodiments, the color filter substrate further includes a planarization layer on a side of the light-shielding pattern, the color filtering layer and the transparent non-filtering layer distal to the first base substrate, and the planarization layer and the transparent non-filtering layer have a one-piece structure.

In some embodiments, the display panel further includes a polarizing layer on a side of the color filter substrate distal to the array substrate, wherein the polarizing layer includes: a scattering film, a quarter-wave plate, a half-wave plate and a polarizer sequentially stacked along a direction away from the color filter substrate; wherein the array substrate includes: a second base substrate and a reflective layer, wherein the reflective layer is on a side of the base second substrate proximal to the color filter substrate.

In some embodiments, in each pixel region with the transparent region, a ratio of an area of the transparent region to an area of the pixel region is in a range of (0, 0.36], wherein each of the plurality of pixel regions includes the transparent region, and each transparent region is filled with the transparent non-filtering layer, and wherein in each of the plurality of pixel regions, the transparent non-filtering layer is on a side of the color filtering layer; or, the transparent non-filtering layer is on two opposite sides of the color filtering layer; or, the color filtering layer includes a first color filtering sub-pattern and a second color filtering sub-pattern, and the transparent non-filtering layer is between the first color filtering sub-pattern and the second color filtering sub-pattern; or, the transparent non-filtering layer is in a middle of the color filtering layer, and the color filtering layer surrounds the transparent non-filtering layer; or, the transparent non-filtering layer surrounds the color filtering layer; or, the color filtering layer includes a plurality of color filtering sub-patterns, the transparent non-filtering layer includes a plurality of transparent sub-patterns, and the plurality of color filtering sub-patterns and the plurality of transparent sub-patterns are alternately arranged along a first preset direction; or, the color filtering layer includes a plurality of color filtering sub-patterns, the transparent non-filtering layer includes a plurality of transparent sub-patterns, and the plurality of color filtering sub-patterns and the plurality of transparent sub-patterns are alternately arranged along both the first preset direction and a second preset direction, the first preset direction intersecting the second preset direction.

In a third aspect, the embodiment of the present disclosure further provides a manufacturing method for a color filter substrate, including steps of: forming a light-shielding pattern on a side of a base substrate such that the light-shielding pattern is provided with a plurality of openings to define a plurality of pixel regions arranged in an array, each of the plurality of pixel regions at least includes a color filtering region, and at least one of the plurality of pixel regions further includes at least one transparent region; forming a color filtering layer in each color filtering region, and forming a transparent non-filtering layer in each transparent region of the at least one transparent region.

In some embodiments, the manufacturing method further includes forming a planarization layer on a side of the light-shielding pattern, the color filtering layer, and the transparent non-filtering layer distal to the first substrate base, the steps of forming the color filtering layer, forming the transparent non-filtering layer and forming the planarization layer includes steps of: forming the plurality of color filtering layers in the plurality of color filtering regions; forming a transparent planarization material on a side of the light-shielding pattern, the color filtering layer distal to the first base substrate, and in the plurality of transparent regions; performing a drying process on the transparent planarization material to obtain the transparent non-filtering layer and the planarization layer.

In some embodiments, in each pixel region with the transparent region, a ratio of an area of the transparent region to an area of the pixel region is in a range of (0, 0.36], wherein each of the plurality of pixel regions includes the transparent region, and each transparent region is filled with the transparent non-filtering layer, and wherein in each of the plurality of pixel regions, the transparent non-filtering layer is on a side of the color filtering layer; or, the transparent non-filtering layer is on two opposite sides of the color filtering layer; or, the color filtering layer includes a first color filtering sub-pattern and a second color filtering sub-pattern, and the transparent non-filtering layer is between the first color filtering sub-pattern and the second color filtering sub-pattern; or, the transparent non-filtering layer is in a middle of the color filtering layer, and the color filtering layer surrounds the transparent non-filtering layer; or, the transparent non-filtering layer surrounds the color filtering layer; or, the color filtering layer includes a plurality of color filtering sub-patterns, the transparent non-filtering layer includes a plurality of transparent sub-patterns, and the plurality of color filtering sub-patterns and the plurality of transparent sub-patterns are alternately arranged along a first preset direction; or, the color filtering layer includes a plurality of color filtering sub-patterns, the transparent non-filtering layer includes a plurality of transparent sub-patterns, and the plurality of color filtering sub-patterns and the plurality of transparent sub-patterns are alternately arranged along both the first preset direction and a second preset direction, the first preset direction intersecting the second preset direction.

DETAIL DESCRIPTION OF EMBODIMENTS

To enable a person skilled in the art to better understand technical solutions of the present disclosure, a color filter substrate and a manufacturing method thereof, and a reflective display panel according to the present disclosure will be further described in detail below with reference to the accompanying drawings.

For a color reflective product, the reflectivity of the color reflective product is reduced more than that of a black and white reflective product, because a color film (including a light-shielding bar and color filtering films) is provided in the color reflective product. For example, for a 10% color gamut display, the reflectivity of the color reflective product is about 50% lower than that of the black and white reflective product. Under the condition of weak external environment light, the color reflective product is influenced by the reflectivity of the color reflective product, and the display effect of a screen cannot meet outdoor sensing experience requirements of a user. At present, the color reflective product usually uses polarizers with different scattering films to improve its reflectivity. For example, the reflectivity may be improved by 170% at most. However, the improvement of the reflectivity by the scattering films is usually limited to one direction, so that the uniformity of the reflectivity is greatly reduced, and the cost of the scattering film is high.

Figure 1A:
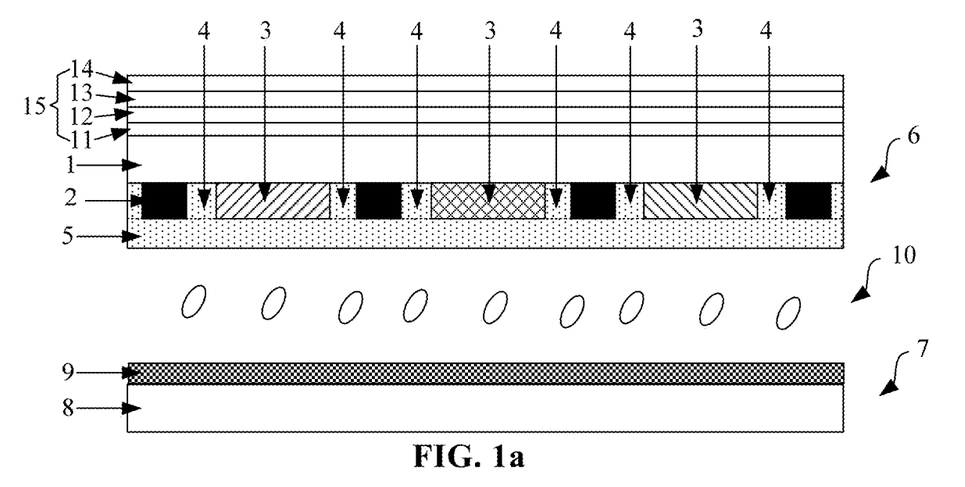
FIG. 1a is a schematic diagram of a structure of a display panel according to an embodiment of the present disclosure.
Figure 1B:
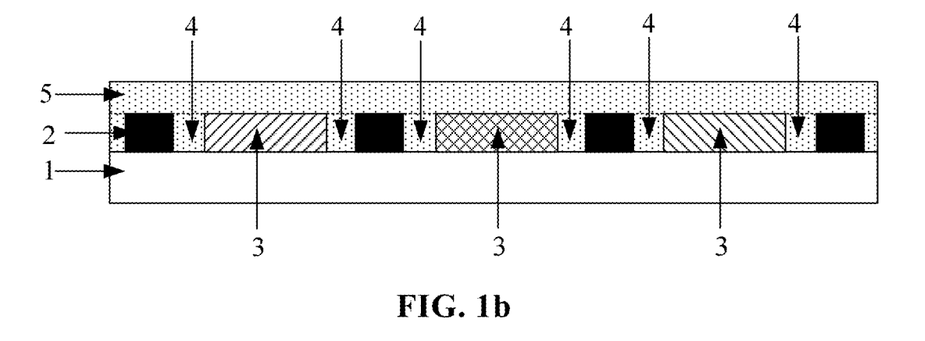
FIG. 1b is a schematic diagram of a structure of a color filter substrate according to an embodiment of the present disclosure.
Figure 2:
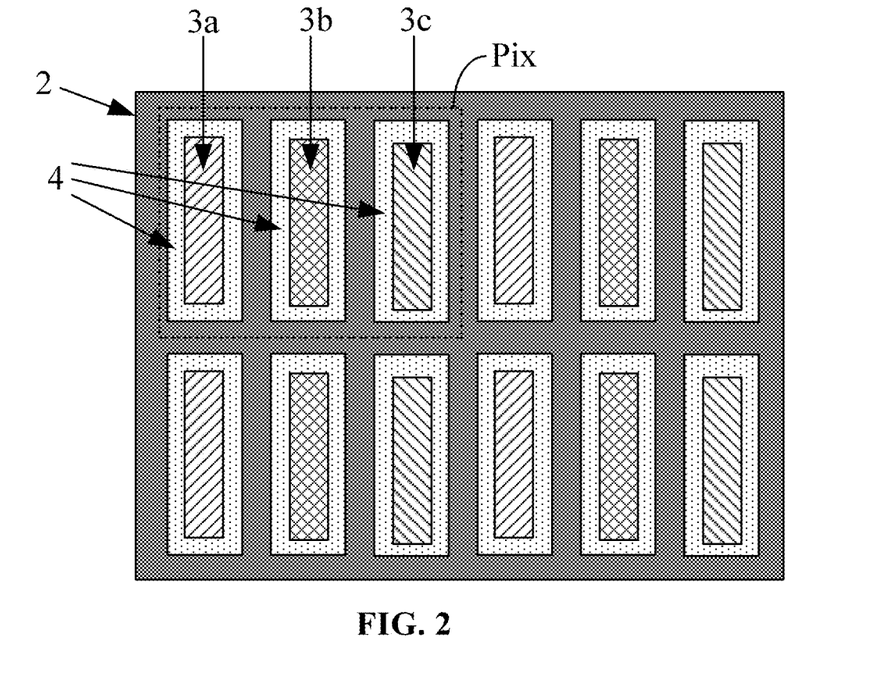
FIG. 2 is a schematic top view of a color filter substrate according to an embodiment of the present disclosure.

FIG. 1a is a schematic structural diagram of a reflective display panel according to an embodiment of the present disclosure. FIG. 1b is a schematic structural diagram of a color filter substrate 6 according to an embodiment of the present disclosure. FIG. 2 is a schematic top view of the color filter substrate 6 according to the embodiment of the present disclosure.

As shown in FIGS. 1a to 2, the present disclosure provides a display panel for a color reflective display device. The display panel includes: a color filter substrate 6, an array substrate 7 and a liquid crystal layer 10, the color filter substrate 6 and the array substrate 7 are provided opposite to each other, and the liquid crystal layer is located between the color filter substrate 6 and the array substrate 7.

The color filter substrate 6 includes: a first base substrate 1. A light-shielding pattern 2 (black matrix) is disposed on the first substrate 1, the light-shielding pattern 2 has a plurality of openings to define a plurality of pixel regions arranged in an array, each of the pixel regions at least includes a color filtering region, and a color filtering layer 3 is filled in each color filtering region. At least one of the plurality of pixel regions further includes at least one transparent region, and a transparent non-filtering layer 4 is filled in each transparent region of the at least one transparent region. In an embodiment of the present disclosure, the aperture ratio of the pixel region is 80%. However, the present disclosure is not limited thereto. In other embodiments of the present disclosure, the aperture ratio of the pixel region may be greater than 80%, or less than 80%.

In the embodiments of the present disclosure, the "color filtering layer" refers to a layer capable of filtering light in some wavelength of visible light. For example, a red filtering layer refers to a layer which may filter out light other than red light in visible light and is only transmissible to red light. The transparent non-filtering layer is a layer which cannot filter and is transmissible to light in a visible light wavelength.

In the pixel region provided with the transparent region, a light transmittance of the transparent non-filtering layer 4 is greater than that of the color filtering layer 3. Generally, the light transmittance of the transparent non-filtering layer 4 is as great as possible. Illustratively, the transparent non-filtering layer 4 is made of a transparent resin material, and has the light transmittance of more than 80%.

In some embodiments, a material of the color filtering layer 3 is a high-transmittance resin material, and a thickness of the color filtering layer 3 is in a range of 1.5 um to 2.5 um.

The array substrate 7 includes: a second base substrate 8, wherein a reflective layer 9 is arranged on a side of the second substrate 8 proximal to the color filter substrate 6.

Generally, the array substrate 7 is further provided with a functional structure for display (not shown) such as a signal wiring layer, a thin film transistor, and the functional structure for display belongs to a conventional structure and is not described herein again.

When displaying, external light firstly passes through the pixel regions on the color filter substrate 6 and strikes the reflective layer 9 on the array substrate 7, and is reflected by the reflective layer 9, the reflected light passes through the pixel regions on the color filter substrate 6 again, so as to realize color image display.

In some embodiments, a polarizing layer 15 is disposed on a side of the color filter substrate distal to the array substrate, and the polarizing layer 15 is matched with the liquid crystal layer 10 for use. Further, the polarizing layer 15 includes: a scattering film 11, a quarter-wave plate 12, a half-wave plate 13 and a polarizer 14 sequentially stacked along a direction away from the color filter substrate 6 and matched with each other for use, so that the overall light transmittance of the polarizing layer 15 may be effectively improved.

In the embodiment of the present disclosure, by providing the transparent region in at least the pixel region and filling the transparent region with the transparent non-filtering layer 4, the light transmittance of the pixel region including the transparent region may be increased, and for the whole color filter substrate, the overall light transmittance of the color filter substrate is also increased. When the color filter substrate is applied in a color reflective display device, the light reflectivity of the color reflective display device may be increased, and the display quality of the color reflective display device may be improved. Even under the condition of weak external environment light, the color reflective display device according to the embodiment of the present disclosure has higher light reflectivity, so that a display picture with better quality may be presented.

In a case of constant area of the pixel region, the larger an area of the transparent region is, the larger the overall light transmittance of the pixel region is, such that the weaker the color filtering effect of the pixel region is, and the smaller a color gamut is.

It is designed in the present disclosure that a light transmittance WY of a complete pixel (generally, including 3 pixel regions of different colors), an overall light reflectivity R_panel of the reflective display panel when the color filter substrate is applied to the reflective display panel, and the color gamut Gamut of the reflective display panel are respectively detected, for transparent regions of different sizes and under a same test environment, specifically as follows:

Control design: no transparent region is provided in the pixel region, the color filtering layer 3 fills the entire pixel region, and a ratio of an area of the transparent region to an area of the pixel region is $S_0=0$. A detection result is: the light transmittance of a complete pixel is $WY_0=44.52\%$, the overall light reflectivity of the reflective display panel when the color filter substrate is applied to the reflective display panel, is $R\_panel_0=40.60\%$, and the color gamut of the reflective display panel is $Gamut_0=11\%$.

Transparent region design 1: the transparent region is provided in the pixel region, and the ratio of the area of the transparent region to the area of the pixel region is $S_1=10.7\%$. A detection result is: the light transmittance of a complete pixel is $WY_1=49.6\%$, the overall light reflectivity of the reflective display panel when the color filter substrate is applied to the reflective display panel, is $R\_panel_1=43.4\%$, and the color gamut of the reflective display panel is $Gamut_1=8\%$.

Transparent region design 2: the transparent region is provided in the pixel region, and the ratio of the area of the transparent region to the area of the pixel region is $S_2=23.1\%$. A detection result is: the light transmittance of a complete pixel is $WY_2=55.5\%$, the overall light reflectivity of the reflective display panel when the color filter substrate is applied to the reflective display panel, is $R\_panel_2=48.6\%$, and the color gamut of the reflective display panel is $Gamut_2=5\%$.

Transparent region design 3: the transparent region is provided in the pixel region, and the ratio of the area of the transparent region to the area of the pixel region is $S_3=36.0\%$. A detection result is: the light transmittance of a complete pixel is $WY_3=61.7\%$, the overall light reflectivity of the reflective display panel when the color filter substrate is applied to the reflective display panel, is $R\_panel_3=54.0\%$, and the color gamut of the reflective display panel is $Gamut_3=3\%$.

It can be seen from the detection results that the overall light reflectivity of the reflective display panel may be improved by 7%, 20% and 33% for the transparent region design 1, the transparent region design 2 and the transparent region design 3, respectively, compared to the control design without the transparent region.

It should be noted that the above four designs, i.e., the control design, the transparent region design 1, the transparent region design 2, and the transparent region design 3, are different only in that the area ratios of the transparent region to the pixel region are different, the other configurations and test conditions are the same.

Users generally feel satisfied with a color picture presented by the color display product with the color gamut of greater than or equal to 3%, so that in the embodiment of the present disclosure, in the pixel region provided with the transparent region, the ratio S of the area of the transparent region to the area of the pixel region is in a range of (0, 0.36], that is, S is greater than 0 and equal to or less than 0.36, so that the color gamut may be ensured to be greater than or equal to 3% while the light reflectivity is improved.

It should be noted that in different products, materials/thicknesses of the color filtering layers may be different, and thus, the color gamuts of the reflective display panel may also be different when the transparent non-filtering layers are not provided (i.e., corresponding to the control design). For example, due to the different materials/thicknesses of the color filtering layers, the color gamut $Gamut_0$ measured against the control design may be greater than 11% or less than 11%. In this case, when the color gamut of the reflective display panel is equal to or greater than 3%, the maximum value of the area ratio S of the transparent region to the pixel region may be greater than 36% or less than 36%. In other words, the maximum value of the area ratio S of the transparent region to the pixel region may vary due to the different materials/thicknesses of the color filtering layers.

In the embodiment of the present disclosure, if transparent regions are disposed in all pixel regions on the color filter substrate and the light transmittance of the transparent non-filtering layer 4 is $n_0$, a ratio of the overall light reflectivity $R\_panel_x$ of the reflective display panel when the color filter substrate is applied to the reflective display panel to the overall light reflectivity $R\_panel_0$ in the control design has the following relationship:

$$\frac{R\_panel_x}{R\_panel_0} \propto n_0^2 * \frac{WY_x}{WY_0}$$

WYx represents the light transmittance of a complete pixel when the area ratio of the transparent region to the pixel region is Sx; where $$WYx = \frac{\sum_{i=0}^{m} Y_i}{m}, Y_i = n_i * (1 - Sx_i) + n_0 * Sx_i.$$

m represents the number of pixel regions included in a complete pixel, Yi represents the light transmittance of the ith pixel region in the complete pixel, $n_i$ represents the light transmittance of the color filtering layer 3 in the ith pixel region, $Sx_i$ represents the area ratio of the transparent region to the pixel region in the ith pixel region, $1 \leq i \leq m$ and i is an integer.

In the color filter substrate provided in the embodiment of the present disclosure, in different pixel regions provided with transparent regions, the area ratio S of the transparent region to the pixel region in a pixel region and the area ratio S in another pixel region may be the same or different.

In the color filter substrate provided in the embodiment of the present disclosure, in different pixel regions provided with transparent regions, a position (a shape) of the transparent region in a pixel region and a position (a shape) in another pixel region may be the same or different.

In the embodiment of the present disclosure, each pixel region may be individually designed. That is, whether or not the transparent region is provided in the pixel region, and a size, a position, a shape and the like of the transparent region may be individually designed according to practical requirements. In the embodiment of the present disclosure, it is preferable that each pixel region is provided with the transparent region having a same size and a same shape, and each transparent region is uniformly distributed in the pixel region, so as to ensure that a display screen of the reflective display panel has good uniformity when the color filter substrate is applied to the reflective display panel.

In the embodiment of the present disclosure, a thickness of the light-shielding pattern, a thickness of the transparent non-filtering layer and the thickness of the color filtering layer are same.

FIG. 2 only shows that the transparent region is provided in each pixel region, and the size, the position, and the shape of the transparent region in each pixel region are same, which is only exemplary, and does not limit the technical solution of the present disclosure. In addition, FIG. 2 also only shows that the transparent non-filtering layer 4 surrounds the color filtering layer 3 in each pixel region.

Figure 3:
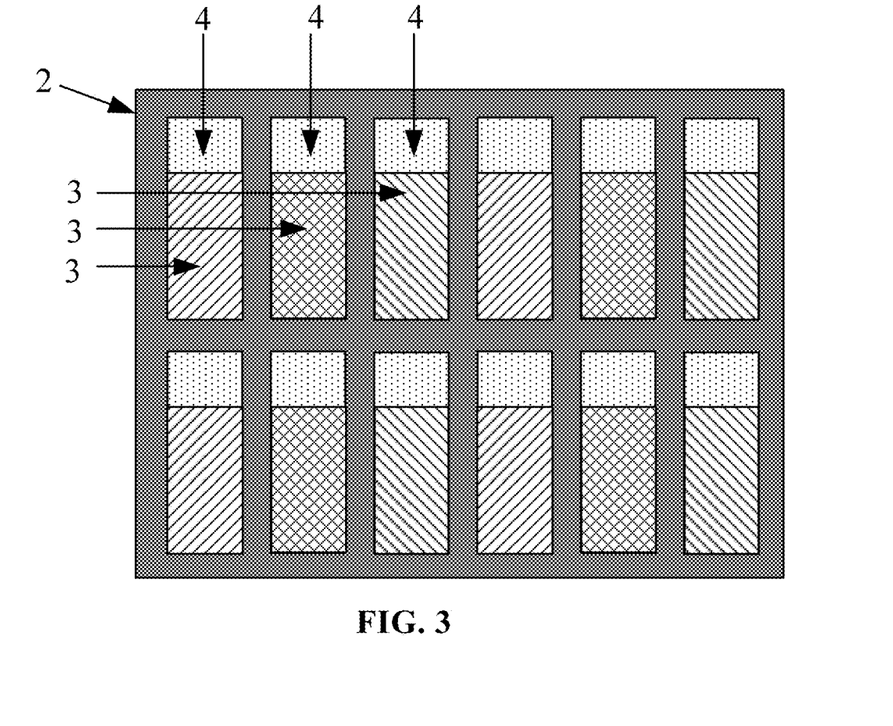
FIG. 3 is a schematic top view of a color filter substrate according to an embodiment of the present disclosure.

FIG. 3 is a schematic top view of another color filter substrate according to an embodiment of the present disclosure. As shown in FIG. 3, unlike the case shown in FIG. 2, the transparent non-filtering layer 4 is located on a side of the color filtering layer 3 in each pixel region, in the case shown in FIG. 3.

Figure 4:
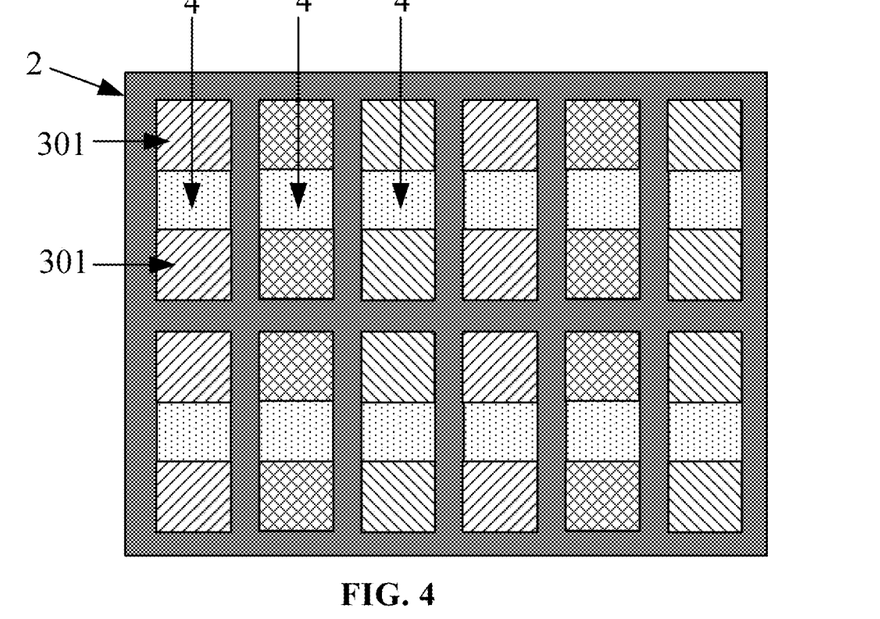
FIG. 4 is a schematic top view of a color filter substrate according to an embodiment of the present disclosure.

FIG. 4 is a schematic top view of yet another color filter substrate according to an embodiment of the present disclosure. As shown in FIG. 4, unlike the case shown in FIGS. 2 and 3, in the case shown in FIG. 4, the color filtering layer 3 includes a first color filtering sub-pattern 301 and a second color filtering sub-pattern 301 in each pixel region, and the transparent non-filtering layer 4 is located between the first color filtering sub-pattern 301 and the second color filtering sub-pattern 301. That is, the transparent non-filtering layer 4 is disposed in the middle of the pixel region to space the color filtering layer 3 apart so that the color filtering layer 3 divides into two identical portions, the first color filtering sub-pattern 301 and the second color filtering sub-pattern 301.

Figure 5:
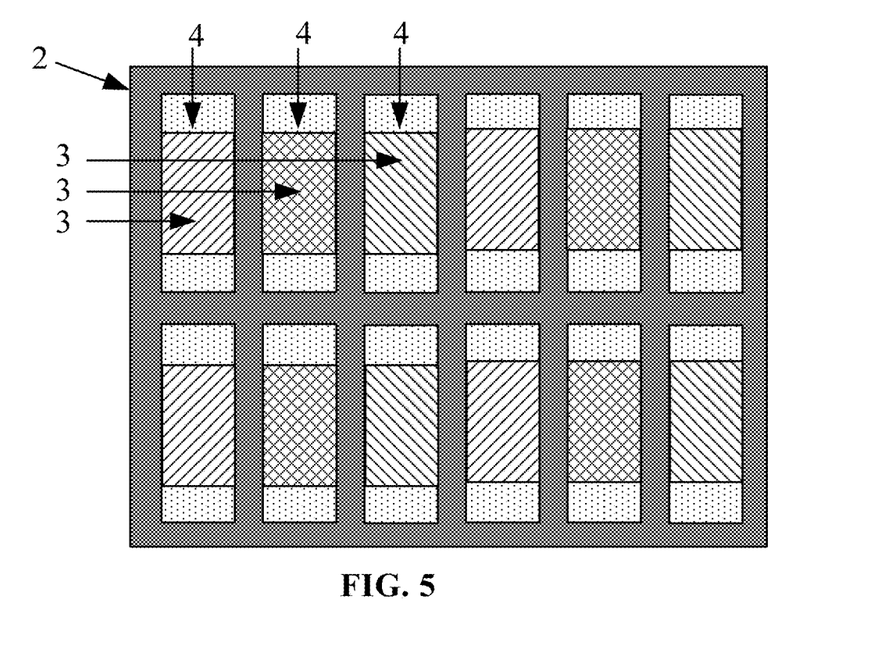
FIG. 5 is a schematic top view of a color filter substrate according to an embodiment of the present disclosure.

FIG. 5 is a schematic top view of still another color filter substrate according to an embodiment of the present disclosure. As shown in FIG. 5, unlike the cases shown in FIGS. 2 to 4, the transparent non-filtering layers 4 are located on opposite sides of the color filtering layer 3 in each pixel region, in the case shown in FIG. 5. That is, in each pixel region, each of the transparent regions 4 includes a first transparent sub-region and a second transparent sub-region located on opposite sides of the color filtering region 3.

Figure 6:
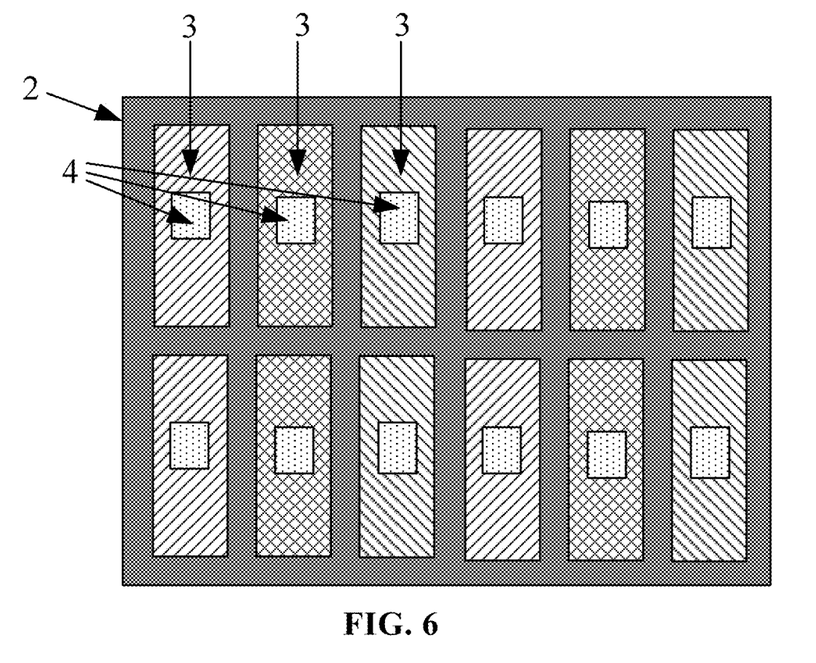
FIG. 6 is a schematic top view of a color filter substrate according to an embodiment of the present disclosure.

FIG. 6 is a schematic top view of still another color filter substrate according to an embodiment of the present disclosure. As shown in FIG. 6, unlike the case shown in FIGS. 2 to 5, in the case shown in FIG. 6, the transparent non-filtering layer 4 is located in the middle of the color filtering layer 3 in each pixel region, and the color filtering layer 3 surrounds the transparent non-filtering layer 4.

Figure 7:
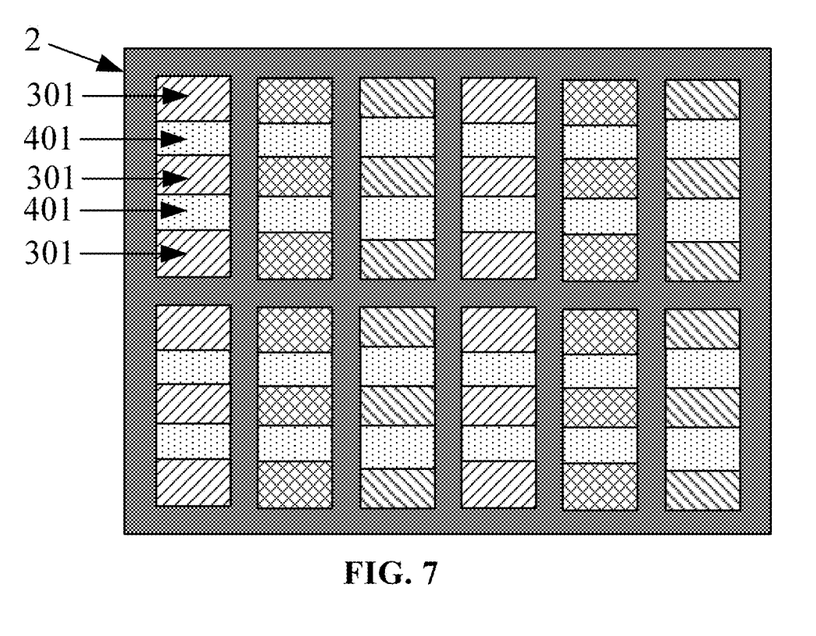
FIG. 7 is a schematic top view of a color filter substrate according to an embodiment of the present disclosure.

FIG. 7 is a schematic top view of still another color filter substrate according to an embodiment of the present disclosure. As shown in FIG. 7, unlike the case shown in FIGS. 2 to 6, in the case shown in FIG. 7, the color filtering layer 3 includes a plurality of color filtering sub-patterns 301, the transparent non-filtering layer 4 includes a plurality of transparent sub-patterns 401, and the plurality of color filtering sub-patterns 301 and the plurality of transparent sub-patterns 401 are alternately arranged in a first preset direction (the vertical direction in FIG. 7) in each pixel region.

Figure 8:
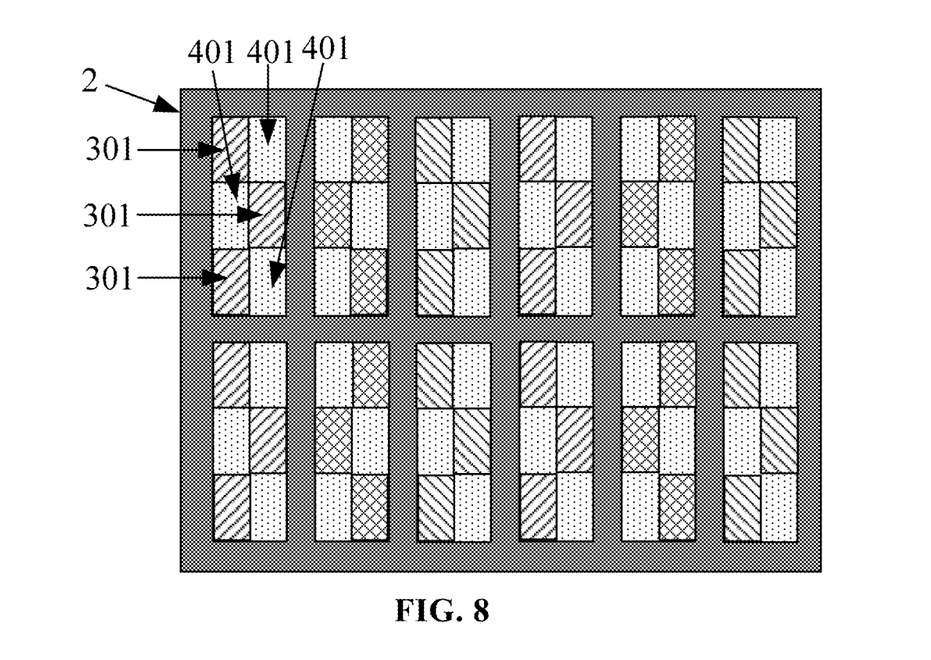
FIG. 8 is a schematic top view of a color filter substrate according to an embodiment of the present disclosure.

FIG. 8 is a schematic top view of still another color filter substrate according to an embodiment of the present disclosure. As shown in FIG. 8, unlike the case shown in FIGS. 2 to 7, in the case shown in FIG. 8, the color filtering layer 3 includes a plurality of color filtering sub-patterns 301, the transparent non-filtering layer 4 includes a plurality of transparent sub-patterns 401, and the plurality of color filtering sub-patterns 301 and the plurality of transparent sub-patterns 401 are alternately arranged along both the first preset direction (the vertical direction in FIG. 8) and a second preset direction (the horizontal direction in FIG. 8) in each pixel region, the first preset direction intersecting the second preset direction.

It should be noted that in pixel patterns, the transparent non-filtering layer/the color filtering sub-patterns have a more complicated distribution, such that the difficulty in manufacturing is greater in the actual process. Under the condition that the area ratio S of the transparent region to the pixel region is constant, and in the case as shown in FIG. 5 that the transparent regions are located on the two opposite sides of the color filtering region in each pixel region, the size of the color filtering layer 3 and a size of an opening for accommodating the transparent non-filtering layer 4 may be relatively large under the condition that the transparent regions are relatively uniformly distributed, which is convenient for production and manufacturing.

In an embodiment of the present disclosure, each pixel region includes a plurality of sub-pixel regions having different colors, and each color filtering layer within the plurality of sub-pixel regions has a corresponding color.

For example, referring to FIG. 2 again, in some embodiments, each of the pixel regions includes a red sub-pixel region, a green sub-pixel region, and a blue sub-pixel region, the color filtering layer in the red sub-pixel region is a red filtering layer 3a, the color filtering layer in the green sub-pixel region is a green filtering layer 3b, and the color filtering layer in the blue sub-pixel region is a blue filtering layer 3c. Full-color display may be realized by adopting an RGB pixel arrangement mode (one complete pixel Pix includes one red sub-pixel region, one green sub-pixel region and one blue sub-pixel region).

Referring to FIGS. 1a and 1b, in some embodiments, the color filter substrate further includes a planarization layer 5 located on a side of the light-shielding pattern 2, the color filtering layer 3, and the transparent non-filtering layer 4 distal to the first base substrate 1, and the planarization layer 5 and the transparent non-filtering layer 4 are integrally formed. That is, the planarization layer 5 and the transparent non-filtering layer 4 may be simultaneously manufactured based on a same material film.

In some embodiments, when the display panel is a Twisted Nematic (TN) display panel, the color filter substrate 6 further includes a common electrode, an alignment film and the like, disposed on a side of the planarization layer 5 distal to the first base substrate 1.

It should be noted that in the reflective liquid crystal display panel according to the embodiment of the present disclosure, a manner of controlling the liquid crystal molecule deflection may be a display control manner such as twisted nematic, In-Plane Switching (IPS), an Advanced Super Dimension Switching (ADS), which is not limited in the present disclosure.

The embodiment of the present disclosure also provides a display device, which is specifically a color reflective display device, including: the display panel according to any of the above embodiments. For the specific description of the display panel, reference may be made to the corresponding contents as above, and details thereof are not repeated here.

In some embodiments, the display device further includes a front light source located on a side of the color filter substrate distal to the array substrate. In a dark environment, light may be provided to the display panel through the front light source (the light is emitted from a side, which is distal to the array substrate, of the color filter substrate to the color filter substrate), so that the reflective display panel may display pictures. Under bright environment, the front light source may be turned off, and the external ambient light is used for displaying pictures.

The embodiment of the present disclosure further provides a color filter substrate, which is the color filter substrate in the display panel provided in the foregoing embodiment. Referring to FIGS. 1a and 1b, the color filter substrate 6 includes: a first base substrate 1. A light-shielding pattern 2 (black matrix) is disposed on the first substrate 1, the light-shielding pattern 2 has a plurality of openings to define a plurality of pixel regions arranged in an array, each of the pixel regions at least includes a color filtering region, and a color filtering layer 3 is filled in each color filtering region. At least one of the plurality of pixel regions further includes at least one transparent region, and a transparent non-filtering layer 4 is filled in each transparent region of the at least one transparent region.

In some embodiments, the color filter substrate 6 further includes a planarization layer 5 located on a side of the light-shielding pattern 2, the color filtering layer 3, and the transparent non-filtering layer 4 distal to the first base substrate 1, and the planarization layer 5 and the transparent non-filtering layer 4 are integrally formed. That is, the planarization layer 5 and the transparent non-filtering layer 4 may be simultaneously manufactured based on a same material film.

The embodiment of the present disclosure further provides a method for manufacturing a color filter substrate, which may be used to manufacture the color filter substrate provided in the foregoing embodiment, and will be described in detail below with reference to the drawings.

Figure 9:
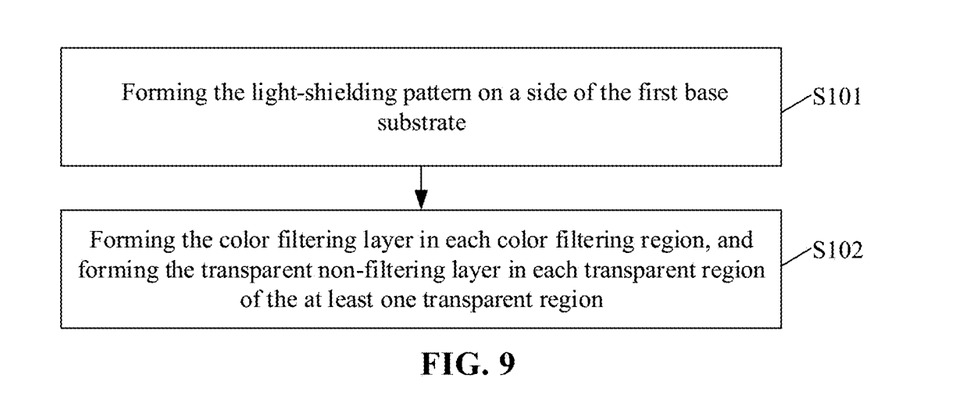
FIG. 9 is a flowchart of a method for manufacturing a color filter substrate according to an embodiment of the present disclosure.

FIG. 9 is a flowchart of a method for manufacturing a color filter substrate according to an embodiment of the present disclosure. As shown in FIGS. 1a and 1b and FIG. 9, the manufacturing method includes steps of:

Step S101, forming the light-shielding pattern on a side of the first base substrate.

The light-shielding pattern is generally made of a black resin material and therefore has light absorption characteristics. The light-shielding pattern is provided with the plurality of openings to define the plurality of pixel regions arranged in an array, each of the pixel regions at least includes the color filtering region, and at least one of the plurality of pixel regions further includes at least one transparent region.

Step S102, forming the color filtering layer in each color filtering region, and forming the transparent non-filtering layer in each transparent region of the at least one transparent region.

For specific descriptions of the color filtering layer and the transparent non-filtering layer, reference may be made to corresponding contents in the foregoing embodiments, and details are not repeated here.

Figure 10:
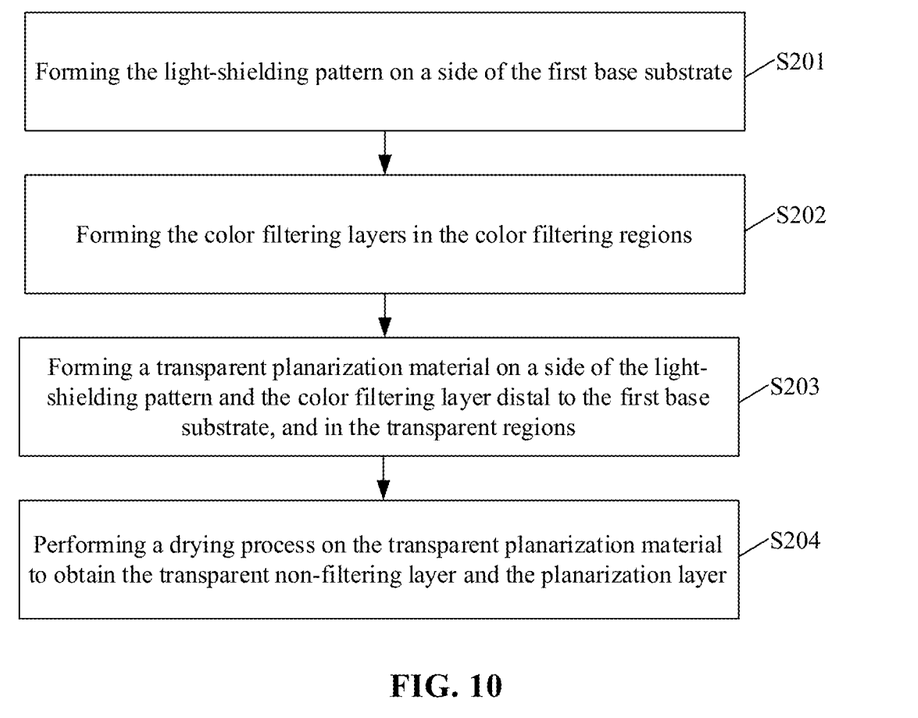
FIG. 10 is a flowchart of a method for manufacturing a color filter substrate according to an embodiment of the present disclosure.

FIG. 10 is a flowchart of another method for manufacturing a color filter substrate according to an embodiment of the present disclosure. As shown in FIGS. 1a and 1b and FIG. 10, the manufacturing method includes steps of:

Step S201, forming the light-shielding pattern on a side of the first base substrate.

The light-shielding pattern is provided with the plurality of openings to define the plurality of pixel regions arranged in an array, each of the pixel regions at least includes the color filtering region, and at least one of the plurality of pixel regions further includes at least one transparent region.

Step S202, forming the color filtering layers in the color filtering regions.

In some embodiments, a color filtering film is first formed on the base substrate, and then, a patterning process is performed on the color filtering film to form the color filtering layer in the color filtering region. Since the color filtering film is generally made of a resin material containing a photoresist, the patterning process may be performed by mask exposure and development.

The types of color filtering layers are generally multiple (for example, the color filtering layers of three different colors RGB provided in the foregoing embodiment), so that the different types of color filtering layers need to be patterned by multiple patterning processes, respectively.

Step S203, forming a transparent planarization material on a side of the light-shielding pattern, the color filtering layer distal to the first base substrate, and in the transparent regions.

Step S204, performing a drying process on the transparent planarization material to obtain the transparent non-filtering layer and the planarization layer.

In the embodiment of the present disclosure, the transparent planarization material is a transparent resin material.

The transparent planarization material will fill the transparent regions during coating the transparent planarization material.

It should be understood that the foregoing embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A color filter substrate, comprising:
a base substrate, and
a light-shielding pattern on the base substrate and having a plurality of openings to define a plurality of pixel regions,
wherein each of the plurality of pixel regions at least comprises a color filtering region, and a color filtering layer is filled in each color filtering region, and
at least one of the plurality of pixel regions further comprises at least one transparent region, each of which is filled with a transparent non-filtering layer;
wherein in each pixel region with the transparent region, a ratio of an area of the transparent region to an area of the pixel region is in a range of (0, 0.36];
wherein each of the plurality of pixel regions comprises the transparent region, and each transparent region is filled with the transparent non-filtering layer, and the transparent regions of the plurality of pixel regions have a same size and a same shape; and
wherein the plurality of pixel regions are arranged in an array along a first preset direction and a second preset direction; and each of the plurality of pixel regions is provided with two transparent non-filtering layers, which are arranged on two opposite sides of the color filtering layer along a first preset direction and the color filter layer is entirely arranged between the two transparent non-filtering layers.

2. The color filter substrate according to claim 1, wherein the transparent non-filtering layer comprises a transparent resin material, and has a light transmittance of greater than 80%.

3. The color filter substrate according to claim 2, wherein a thickness of the transparent non-filtering layer is in a range of 1.5 um to 2.5 um.

4. The color filter substrate according to claim 3, wherein the color filtering layer comprises a resin material, and a thickness of the color filtering layer is in a range of 1.5 um to 2.5 um.

5. The color filter substrate according to claim 4, wherein the resin material comprises photoresist, and the light-shielding pattern comprises a black resin material.

6. The color filter substrate according to claim 5, wherein a thickness of the light-shielding pattern, the thickness of the transparent non-filtering layer and the thickness of the color filtering layer are identical.

7. The color filter substrate according to claim 1, wherein in each pixel region, each transparent region comprises a first transparent sub-region and a second transparent sub-region on opposite sides of the color filtering region.

8. The color filter substrate according to claim 1, wherein each pixel region comprises a plurality of sub-pixel regions of different colors, and color filtering layers in the plurality of sub-pixel regions have respective colors.

9. The color filter substrate according to claim 8, wherein each pixel region comprises a red sub-pixel region, a green sub-pixel region, and a blue sub-pixel region, the color filtering layer in the red sub-pixel region is a red filtering layer, the color filtering layer in the green sub-pixel region is a green filtering layer, and the color filtering layer in the blue sub-pixel region is a blue filtering layer.

10. The color filter substrate according to claim 1, wherein the color filter substrate further comprises a planarization layer on a side of the light-shielding pattern, the color filtering layer and the transparent non-filtering layer distal to the base substrate, and the planarization layer and the transparent non-filtering layer have a one-piece structure.

11. A reflective display panel, comprising: a color filter substrate and an array substrate opposite to each other, and a liquid crystal layer between the color filter substrate and the array substrate;
wherein the color filter substrate comprises:
a first base substrate, and
a light-shielding pattern on a side of the first base substrate proximal to the array substrate and having a plurality of openings to define a plurality of pixel regions,
wherein each of the plurality of pixel regions at least comprises a color filtering region, and a color filtering layer is filled in each color filtering region, and
at least one of the plurality of pixel regions further comprises at least one transparent region, each of which is filled with a transparent non-filtering layer;
wherein in each pixel region with the transparent region, a ratio of an area of the transparent region to an area of the pixel region is in a range of (0, 0.36],
wherein each of the plurality of pixel regions comprises the transparent region, and each transparent region is filled with the transparent non-filtering layer, and
the transparent regions of the plurality of pixel regions have a same size and a same shape; and
wherein the plurality of pixel regions are arranged in an array along a first preset direction and a second preset direction; and each of the plurality of pixel regions is provided with two transparent non-filtering layers, which are arranged on two opposite sides of the color filtering layer along a first preset direction and the color filter layer is entirely arranged between the two transparent non-filtering layers.

12. The reflective display panel according to claim 11, wherein the color filter substrate further comprises a planarization layer on a side of the light-shielding pattern, the color filtering layer and the transparent non-filtering layer distal to the first base substrate, and the planarization layer and the transparent non-filtering layer have a one-piece structure.

13. The reflective display panel according to claim 11, further comprising a polarizing layer on a side of the color filter substrate distal to the array substrate, wherein the polarizing layer comprises: a scattering film, a quarter-wave plate, a half-wave plate and a polarizer sequentially stacked along a direction away from the color filter substrate;
wherein the array substrate comprises: a second base substrate and a reflective layer, wherein the reflective layer is on a side of the base second substrate proximal to the color filter substrate.

14. A manufacturing method for a color filter substrate, comprising steps of:
forming a light-shielding pattern on a side of a base substrate such that the light-shielding pattern is provided with a plurality of openings to define a plurality of pixel regions arranged in an array, each of the plurality of pixel regions at least comprises a color filtering region, and at least one of the plurality of pixel regions further comprises at least one transparent region;
forming a color filtering layer in each color filtering region, and forming a transparent non-filtering layer in each transparent region of the at least one transparent region;
wherein in each pixel region with the transparent region, a ratio of an area of the transparent region to an area of the pixel region is in a range of (0, 0.36],
wherein each of the plurality of pixel regions comprises the transparent region, and each transparent region is filled with the transparent non-filtering layer, and
the transparent regions of the plurality of pixel regions have a same size and a same shape; and
wherein the plurality of pixel regions are arranged in an array along a first preset direction and a second preset direction; and each of the plurality of pixel regions is provided with two transparent non-filtering layers, which are arranged on two opposite sides of the color filtering layer along a first preset direction and the color filter layer is entirely arranged between the two transparent non-filtering layers.

15. The manufacturing method according to claim 14, further comprising forming a planarization layer on a side of the light-shielding pattern, the color filtering layer, and the transparent non-filtering layer distal to the first substrate base,
wherein the steps of forming the color filtering layer, forming the transparent non-filtering layer and forming the planarization layer comprises steps of:
forming the plurality of color filtering layers in the plurality of color filtering regions;
forming a transparent planarization material on a side of the light-shielding pattern, the color filtering layer distal to the first base substrate, and in the plurality of transparent regions;
performing a drying process on the transparent planarization material to obtain the transparent non-filtering layer and the planarization layer.

* * * * *